UNITED STATES PATENT OFFICE 2,336,521

DIOXAZINE-TYPE DYESTUFFS AND PROCESS FOR PREPARING THE SAME

Frithjof Zwilgmeyer, Wilmington, Del., assignor to E. I. du Pont de Nemours & Company, Wilmington, Del., a corporation of Delaware No Drawing. Application January 21, 1943, Serial No. 473,118

8 Claims. (Cl. 260—246)

This invention relates to novel dyestuff compounds suitable for dyeing cotton and other textiles, and to a process of preparing the same, this application being a continuation-in-part of my copending application Serial No. 393,484, filed May 14, 1941.

More particularly, this invention deals with novel dioxazine-type dyestuffs which are obtainable by causing oleum, sulfuric acid or chlorosulfonic acid to act upon a compound of the general formula

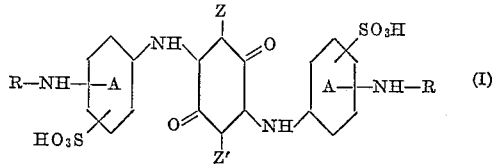

wherein each of the benzene radicals marked A has at least one free ortho-position, and wherein Z and Z' individually represent hydrogen, halogen or alkyl, while R is the radical of an azole compound selected from the group consisting of the benzpyrazoles and the benztriazoles. Expressed in different words, R is the radical of a compound of the general formula

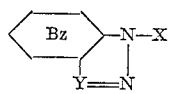

wherein Y stands for CH or N, X stands for hydrogen, alkyl, hydroxy-alkyl, and aryl, including in the latter term substituted aryl such as dihalogen-aryl, etc.; while the hydrogen atoms of the Bz ring may be replaced by customary auxochromic substituents, such as alkyl, alkoxy or halogen.

The treatment of the above type compound with oleum, etc., results in closure of the two rings next to the central quinone radical, yielding a dioxazine dyestuff. This effect, however, is accompanied by sulfonation, and in the subsequent treatment of the product, some desulfonation or shifting of the SO₃H groups takes place, as a result of which the formula of the final product is uncertain. The most that can be said about the final product is that it probably corresponds to the general formula

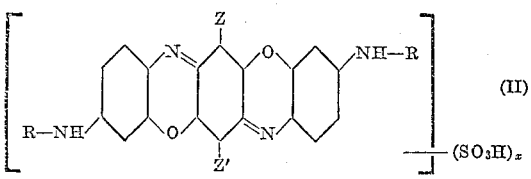

wherein Z, Z' and R have the same significance as above, while x designates an undetermined number, probably not greater than 4.

It will be noted that our novel products differ from compounds in the prior art having the same general formula, in the structure of R. In the novel compounds of this invention R is the radical of an azole, and is therefore characterized by a structure consisting of one homocyclic ring of 6 carbon atoms and of one heterocyclic 5-membered ring fused together.

I have found that dioxazine dyes as thus defined have outstanding qualities as dyestuffs for wool, giving strong and brilliant dyeings of good light-fastness and excellent wash fastness. They also possess excellent affinity for cotton fiber, and as a result of these two properties the novel dyes of this series are particularly suitable for dyeing union fabrics. In addition, they may also be used for dyeing silk, regenerated cellulose and nylon fibers.

The synthesis of my novel compounds may follow in general the prior practice of the art except for the choice of R. In some cases, however, I may include in this process a special after-treatment step with anhydrous HCl (or NaCl+anhydrous H₂SO₄) at elevated temperature, as more fully illustrated in Example 1 below. I find that this step enhances the exhausting properties of the final dyestuff, and gives altogether greater tinctorial strength and washing fastness.

Considering now my process in greater detail, the synthesis of my novel dyestuffs may begin by reacting a nitro-halogen-benzene sulfonic acid, for instance 4-nitro-1-chlorobenzene-2-sulfonic acid, with a Bz-amino azole of the type H₂N—R, wherein R is the radical of an azole as above defined. The condensation is effected by the aid of an acid absorbing agent, and may be expressed by the following typical equation:

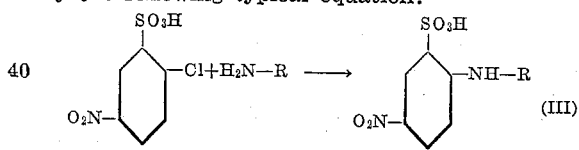

Condensation product III is then subjected to reduction, for instance by the aid of iron and acid, to convert the nitro group into an amino group. Two moles of the reduction product are then condensed in the usual manner with one mole of a benzoquinone selected from the group consisting of benzoquinone, its homologs and halogen derivatives, this condensation again being aided preferably by acid absorbing agents. The result is a compound of Formula I above.

Finally, the compound of Formula I above is subjected to ring closure by the aid of sulfuric acid, oleum or chlorosulfonic acid, which results in a dyestuff.

As a special added feature of this invention, I prefer in certain cases to treat the recovered dyestuff by warming it up in concentrated sulfuric acid (96 to 100% strength) containing a small quantity of sodium chloride, or into which dry HCl gas is fed in catalytic proportions. A small quantity of glacial acetic acid 1 to 2% by weight) may also be added.

Without any intent to limit this invention, the following examples are given to illustrate my preferred mode of operation. Parts mentioned are by weight.

*Example 1*

6.2 parts of tetra-chloro-benzo-quinone (chloranil) are condensed with 16 parts of the compound:

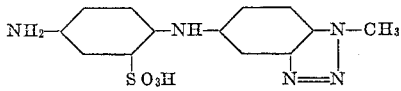

which may be named 5-(4'-amino-2'-sulfoanilino)-1-methyl-benztriazole, and is prepared as described below. This condensation is carried out by heating the two reagents together with 8.2 parts of sodium acetate (anhydrous) or 8.4 parts of sodium bicarbonate and 250 parts of alcohol at reflux for 16 hours, followed by filtering off the precipitate while hot and washing the cake with 50 parts of hot alcohol and drying. There is thus obtained 24 parts of a dark condensation product, which is nearly insoluble in alcohol. This product most probably corresponds to the formula

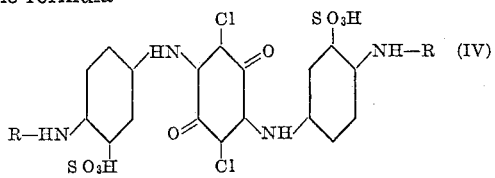

wherein R is the radical of N-methyl-benztriazole.

Five parts of this condensation product are now added slowly, at 23 to 25° C., to 100 parts of fuming sulfuric acid containing 20% sulfuric anhydride; the solution is kept for three hours at 23 to 25° C., whereupon the temperature is raised to 45° C. and kept there for one hour. The reaction mixture is added to ice, and the precipitated dyestuff is filtered off and washed with sodium chloride solution until free of mineral acidity. The wet filter cake is slurried in water and neutralized with soda ash; the sodium salt of the dye is then salted out and filtered. After drying, the dye is obtained in good yield as a purple product. It dyes animal and vegetable fibers bright blue tints of good light fastness.

Instead of raising the temperature to 45° C. as in the example above, the reaction mixture may be diluted with sufficient 78 to 93% sulfuric acid to obtain finally a monohydrate solution; or the ring-closed dye may first be isolated as described above, dried and then added to monohydrate. In the former case the addition of some sodium chloride is preferable. In both cases, the reaction mixture is kept at 50–100° C. for about one hour, drowned in ice and isolated in the above-described manner. Noticeably redder shades of blue are obtained by this treatment at the higher temperature.

Similar redder shades of blue are obtained by substituting 30% oleum for the 20% oleum in the above example. By substituting 2% oleum instead, somewhat greener shades are obtained. The yields are in all cases about the same.

A similar dye is obtained by using chlorosulfonic acid instead of the oleum in the above example. This dye may be redissolved in monohydrate at temperatures from 65 to 100° C., as in the above example, and isolated in the same manner, resulting in a similar change of shade.

*Example 2*

5 parts of the dark condensation product as obtained in the first step in Example 1 are added to 100 parts of sulfuric acid monohydrate and the reaction mixture is heated to 150° C., kept there for one-half hour, and then isolated as a sodium salt as in Example 1. The dye is obtained in good yield as a dark powder. It dyes animal and vegetable fibers bluish-gray tints of good light fastness.

*Example 3*

Example 1 is repeated, except the tetra-chlorobenzoquinone is replaced by the molecular equivalent of toluquinone. The dye is obtained in good yield as a dark purple powder. It dyes animal and vegetable fibers in bluish-gray tints of good light fastness.

*Example 4*

Example 1 is repeated, except the tetra-chlorobenzoquinone is replaced by the molecular equivalent of benzo-quinone.

The dye is obtained in good yield as a dark powder. It dyes animal and vegetable fibers in bluish-gray tints of good light fastness.

*Example 5*

Example 1 is repeated, except that the tetra-chloro-benzo-quinone is replaced by a molecular equivalent of 2:5-dichloro-benzo-quinone.

The dye is obtained in good yield as a dark powder. It dyes animal and vegetable fiber in bright blue tints of good light fastness.

*Example 6*

Example 1 is repeated except that the tetra-chloro-benzo-quinone is replaced by the molecular equivalent of tetra-bromo-benzo-quinone. The dye is obtained in good yield as a dark powder. It dyes animal and vegetable fiber in blue tints of good light fastness.

The initial anilino-benztriazole compound employed in the examples above may be prepared according to my copending application Serial No. 393,483, by condensing 4-nitro-2-sulfo-1-chloro-benzene with 5-amino-1-methyl-benztriazole, which in turn may be prepared from 5-nitro-2-methylamino-aniline by diazotization and subsequent reduction of the nitro group. The mentioned condensation may be effected by heating under pressure an aqueous solution of the two intermediates in the presence of magnesium oxide, and is followed by reduction of the nitro group in the intermediate diarylamine to the corresponding amine.

In a manner similar to the above examples, numerous other dyes of the dioxazine series may be prepared, by replacing the initial intermediate there employed by any other intermediate of the general formula

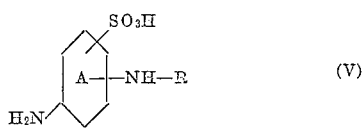

wherein the aryl radical marked A has at least one free ortho-position, and wherein R is the radical of an azole, as above defined. The following table is typical of the intermediates which may be selected and of the shades obtained thereby. In all the cases of this table, 4-nitro-1-chlorobenzene-2-sulfonic acid was employed as initial material for condensation with the amino-benztriazole or pyrazole, while chloranil was selected to furnish the central component of the dioxazine system. The shades indicated are those obtainable on cotton or wool by the resulting dyestuff.

by ring-closing a quinone diamine of the general formula

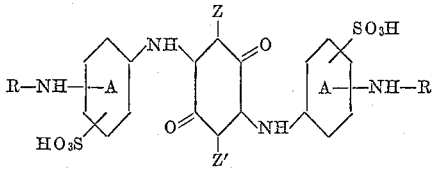

| Ex. | Azole component | Formula | Shade on cotton or wool |
|---|---|---|---|
| 7 | 5-amino-benztriazole | NH₂—⟨⟩—N—H, N=N | Reddish-blue. |
| 8 | 5-amino-1-ethylbenztriazole | NH₂—⟨⟩—N—C₂H₅, N=N | Blue. |
| 9 | 5-amino-1-betahydroxy-ethylbenztriazole | NH₂—⟨⟩—N—C₂H₄OH, N=N | Do. |
| 10 | 5-amino-1-phenylbenztriazole | NH₂—⟨⟩—N—C₆H₅, N=N | Greenish-blue. |
| 11 | 5-amino-1 (2′,5′-dichlorophenyl)-benztriazole | NH₂—⟨⟩—N—⟨⟩(Cl,Cl), N=N | Do. |
| 12 | 5-amino-benzpyrazole | H₂N—⟨⟩—NH, HC=N | Do. |
| 13 | 5-amino-1-methylbenzpyrazole | H₂N—⟨⟩—N—CH₃, HC=N | Blue. |

In each case, the triazole component was prepared from the corresponding 5-nitro-phenylene diamine (substituted as specified in the 1-amino group), by diazotization and subsequent reduction of the nitro group. The benzpyrazole components of Examples 12 and 13 were prepared by reduction of the corresponding 5-nitro compounds, according to Berichte, vol. 37, pages 2577 and 2584.

If 2,5-dichloro-benzo-quinone is used instead of chloranil in the dyestuff synthesis of Examples 7 to 13, similar shades are obtained, while benzoquinone and toluquinone produce bluish grays in all cases.

It will be clear that the above examples are merely illustrative of the many combinations obtainable from the above-described products. For instance, instead of using chloro-benzo-quinones or toluquinone, longer chain alkylated benzoquinones may be used.

According to the present invention, a large number of new dioxazine colors of desirable shade and unusual light fastness are produced. These new dyes, besides showing a good cotton affinity and light fastness, are also of particular value as wool dyes for mixed fibers, since they dye the fiber uniformly and show a surprising brightness on wool. The good wool-dyeing properties of my new series of dyes, particularly those containing alkyl groups, appear to be caused by the presence of a special heterocyclic ring, which in certain cases adds, to a small degree and through its own double bond, to the color of the resulting dye.

I claim:

1. Dioxazine dyestuffs of the group obtainable wherein each of the benzene radicals marked A has at least one free ortho position, and wherein Z and Z′ individually represent a substituent selected from the group consisting of hydrogen, halogen and alkyl, while R is the radical of an azole compound selected from the group consisting of benzpyrazoles and benztriazoles.

2. Dioxazine dyestuffs of the group obtainable by causing a ring-closing agent selected from the group consisting of sulfuric acid, oleum and chlorosulfonic acid to react upon a quinone diamine of the general formula

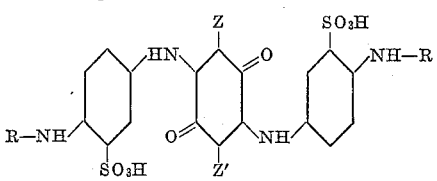

wherein Z and Z′ represent substituents from the group consisting of hydrogen, halogen and alkyl, while R is the radical of a benztriazole.

3. Dioxazine dyestuffs of the group obtainable by causing a ring-clogging agent selected from the group consisting of sulfuric acid, oleum and chlorosulfonic acid to react upon a quinone diamine of the general formula

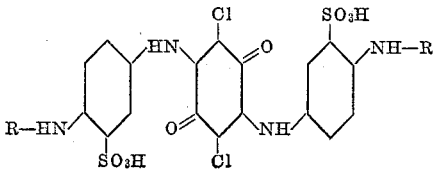

wherein R is the radical of a triazole having the formula

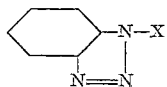

wherein X stands for hydrogen, alkyl, hydroxyalkyl or aryl.

4. A dioxazine dyestuff as defined in claim 3, R being the radical of 1-methyl-benztriazole attached to the NH group in the 5-position.

5. A dioxazine dyestuff as defined in claim 3, R being the radical of 1-beta-hydroxyethyl-benztriazole attached to the NH group in the 5-position.

6. A dioxazine dyestuff as defined in claim 3, R being the radical of 1-dichlorophenyl-benztriazole attached to the NH group in the 5-position.

7. In the process of producing a dioxazine dyestuff, the steps comprising first reacting a benzoquinone with substantially two molal proportions of an amino-diaryl-amine sulfonic acid of the formula

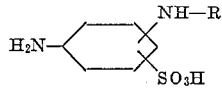

wherein at least one of the positions ortho to the $NH_2$ group is free, and wherein R is the radical of an azole compound selected from the group consisting of benzpyrazoles and benztriazoles, and then reacting upon the intermediate quinone-diamine thus formed with an agent adapted to close the rings adjacent to the quinone nucleus.

8. The process of producing a dioxazine dyestuff which comprises reacting tetrachloro-quinone with substantially two molal ratios of an amino-diaryl-amine-sulfonic acid of the formula

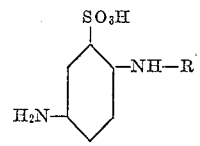

wherein R is the radical of a benztriazole, and then reacting upon the intermediate quinone-diamine thus formed with an agent of the group consisting of sulfuric acid, oleum and cholorsulfonic acid, whereby to close the rings adjacent to the quinone nucleus.

FRITHJOF ZWILGMEYER.

CERTIFICATE OF CORRECTION.

Patent No. 2,336,521. December 14, 1943.

FRITHJOF ZWILGMEYER.

It is hereby certified that error appears in the printed specification of the above numbered patent requiring correction as follows: Page 3, second column, line 65, claim 3, for "ring-clogging" read --ring-closing--; page 4, second column, line 21-22, claim 8, for "cholorsulfonic" read --chlorosulfonic--; and that the said Letters Patent should be read with this correction therein that the same may conform to the record of the case in the Patent Office.

Signed and sealed this 29th day of February, A. D. 1944.

Leslie Frazer

(Seal)

Acting Commissioner of Patents.